US011060886B2

United States Patent
Kruger

(10) Patent No.: US 11,060,886 B2
(45) Date of Patent: Jul. 13, 2021

(54) STEERING POSITION ROTARY SENSOR ASSEMBLY

(71) Applicant: Littelfuse, Inc., Chicago, IL (US)

(72) Inventor: Jay Kruger, Chicago, IL (US)

(73) Assignee: Littelfuse, Inc., Chicago, IL (US)

( * ) Notice: Subject to any disclaimer, the term of this patent is extended or adjusted under 35 U.S.C. 154(b) by 86 days.

(21) Appl. No.: 16/214,487

(22) Filed: Dec. 10, 2018

(65) Prior Publication Data

US 2020/0182655 A1 Jun. 11, 2020

(51) Int. Cl.
   *G01D 5/14* (2006.01)
   *B62D 15/02* (2006.01)
   *G01B 7/30* (2006.01)

(52) U.S. Cl.
   CPC ............. *G01D 5/145* (2013.01); *B62D 15/02* (2013.01); *G01B 7/30* (2013.01)

(58) Field of Classification Search
   CPC ........... G01D 5/145; B62D 15/02; G01B 7/30
   See application file for complete search history.

(56) References Cited

U.S. PATENT DOCUMENTS

| | | | |
|---|---|---|---|
| 6,788,048 B2 * | 9/2004 | Hedayat | B60N 2/002 324/202 |
| 7,021,161 B2 | 4/2006 | Recio et al. | |
| 7,279,816 B2 * | 10/2007 | Oikawa | H02K 49/10 310/36 |
| 2005/0050966 A1 * | 3/2005 | Recio | G01D 5/04 73/862.333 |
| 2011/0115326 A1 * | 5/2011 | Clark | H02K 7/11 310/114 |
| 2016/0216133 A1 * | 7/2016 | Ausserlechner | G01D 5/142 |
| 2018/0245947 A1 * | 8/2018 | Ausserlechner | G01D 5/145 |

FOREIGN PATENT DOCUMENTS

EP    2743662 A1    6/2014

OTHER PUBLICATIONS

Extend European Search Report dated Mar. 26, 2020 for European Patent Application No. 19214838.5.

* cited by examiner

*Primary Examiner* — Akm Zakaria
(74) *Attorney, Agent, or Firm* — Kacvinsky Daisak Bluni PLLC

(57) ABSTRACT

Embodiments herein are directed to steering position rotary sensors including a housing defining an internal cavity, a center shaft extending through the housing, and a gear coupled to the center shaft, wherein the gear is positioned off-center relative to a central rotational axis extending through the center shaft. The steering position rotary sensor may further include a magnet coupled to the gear, a first Hall effect sensor positioned adjacent the gear and concentric with the magnet, and a second Hall effect sensor positioned adjacent the center shaft and concentric with the central rotational axis, wherein the first Hall effect sensor and the second Hall effect sensor are separated by a magnetic shield.

12 Claims, 4 Drawing Sheets

STEERING POSITION ROTARY SENSOR ASSEMBLY

BACKGROUND OF THE DISCLOSURE

Field of the Disclosure

The present disclosure relates to a sensor assembly for measuring steering position and, in particular, to a rotary steering position sensor with gear reduction turn count.

Discussion of Related Art

The absolute angular position of a motor vehicle steering wheel, also referred to as the steering or rotation angle, is required for monitoring or controlling a vehicle dynamic control system, for example. The dynamic control system evaluates the rotation-angle and converts it to various control actuators, such as the brakes. Other typical applications which use rotation-angle as an input include, for example, torque vectoring systems, yaw control systems, chassis controlled stability enhancement systems, electrically assisted power steering, steer-by-wire systems and navigation systems.

Steering wheel position sensors are used in automotive applications for electronic monitoring of steering functions of a motor vehicle. In particular, position sensors are used for determining the angular position of a steering shaft as a user turns a steering wheel. In some examples, a gear may have teeth coupled to a shaft. The teeth engage teeth disposed on a second gear and a third gear. The three gears have a different number of teeth. A pair of absolute position sensors may be positioned in proximity to the second gear and the third gear for generating an output that corresponds to the angular positions of the gears. As long as the number of teeth on each of the gears is known, it is possible to calculate the angular position of the steering shaft based on the outputs of the absolute position sensors. However, many current sensors utilize a microprocessor to determine a number of complete turns of the steering column, thus adding cost to the sensor assembly.

In view of the above, there exists a need for an improved, cost-efficient steering position rotary sensor assembly.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In one or more embodiments, an assembly may include a steering position rotary sensor comprising a housing, a center shaft extending through the housing, and a gear coupled to the center shaft, wherein the gear is positioned off-center relative to a central rotational axis extending through the center shaft. The assembly may further include a magnet coupled to the gear, and a first Hall effect sensor positioned adjacent the gear and concentric with the magnet. The assembly may further include a second Hall effect sensor positioned adjacent the center shaft and concentric with the central rotational axis, wherein the first Hall effect sensor and the second Hall effect sensor are separated by a magnetic shield.

In one or more embodiments, a steering position rotary sensor assembly may include a housing defining an internal cavity, a center shaft extending through the housing, and a gear coupled to the center shaft, wherein the gear is positioned off-center relative to a central rotational axis extending through the center shaft. The assembly may further include a magnet coupled to the gear, and a first Hall effect sensor positioned adjacent the gear and concentric with the magnet. The assembly may further include a second Hall effect sensor positioned adjacent the center shaft and concentric with the central rotational axis, wherein the first Hall effect sensor and the second Hall effect sensor are separated by a magnetic shield.

In one or more embodiments, a steering position rotary sensor assembly may include a housing defining an internal cavity, a center shaft extending through the housing, and one or more gears coupled to the center shaft, wherein the one or more gears are positioned off-center relative to a central rotational axis extending through the center shaft. The assembly may further include a magnet coupled to the one or more gears, wherein the magnet is positioned within the internal cavity of the housing, and a first Hall effect sensor positioned adjacent the one or more gears and concentric with the magnet. The assembly may further include a second Hall effect sensor positioned adjacent the center shaft and concentric with the central rotational axis, wherein the first Hall effect sensor and the second Hall effect sensor are separated by a magnetic shield.

BRIEF DESCRIPTION OF THE DRAWINGS

The accompanying drawings illustrate exemplary approaches of the disclosed output steering position rotary sensor so far devised for the practical application of the principles thereof, and in which.

Figure 1:
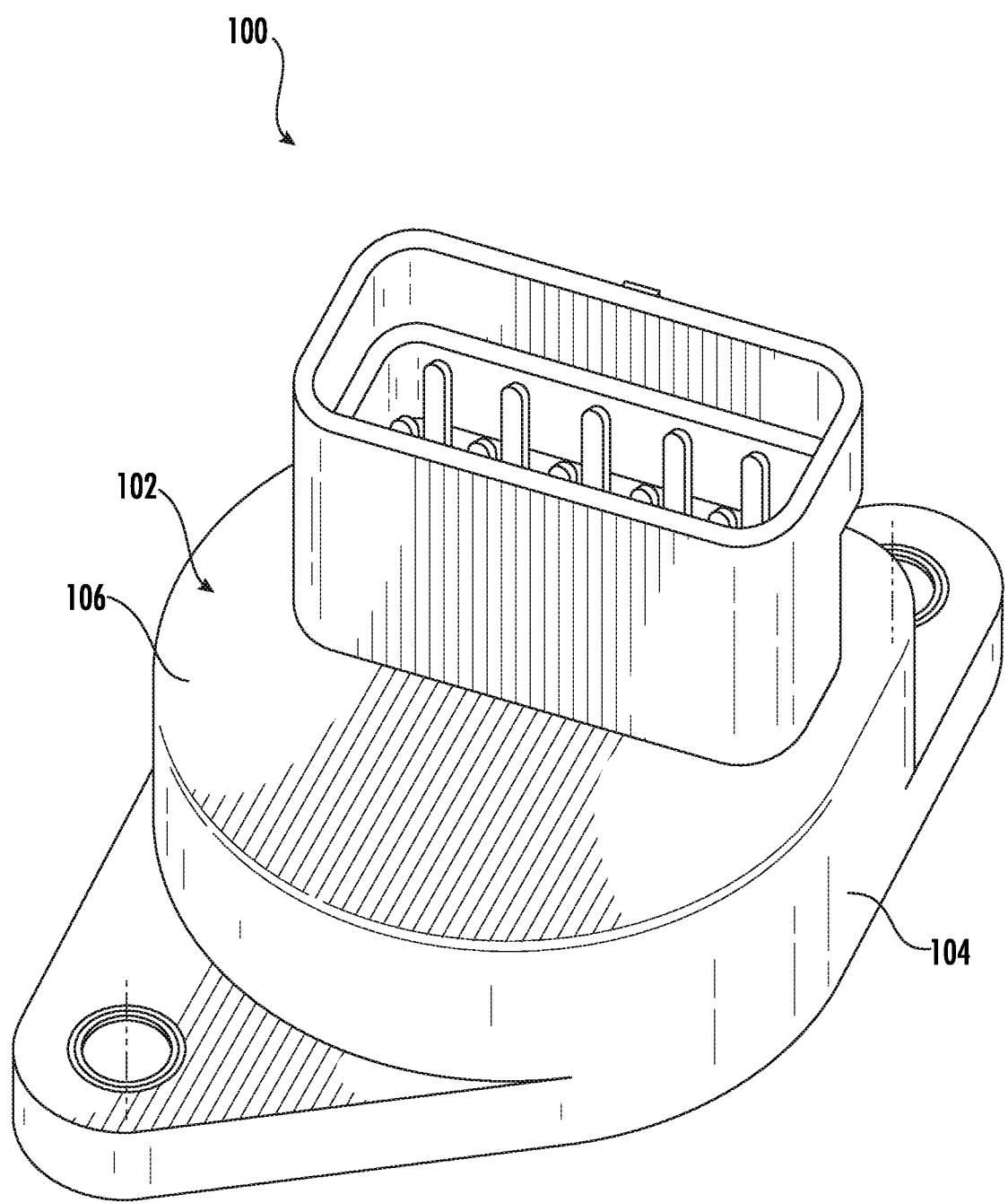
FIG. 1 is a perspective view of a steering position rotary sensor according to exemplary embodiments of the disclosure.

The drawings are not necessarily to scale. The drawings are merely representations, not intended to portray specific parameters of the disclosure. Furthermore, the drawings are intended to depict exemplary embodiments of the disclosure, and therefore is not considered as limiting in scope.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

The present disclosure will now proceed with reference to the accompanying drawings, in which various approaches are shown. It will be appreciated, however, that the steering position rotary sensor may be embodied in many different forms and should not be construed as limited to the approaches set forth herein. Rather, these approaches are provided so that this disclosure will be thorough and complete, and will fully convey the scope of the disclosure to those skilled in the art. In the drawings, like numbers refer to like elements throughout.

Embodiments herein provide an apparatus and associated method for measuring an absolute steering angle of a steering shaft, rotating by more than 360 degrees, to reduce measurement errors and to simplify a calculation procedure. In some exemplary embodiments, the steering angle may greater than 1440° (e.g., +720, −720). Another object of the present disclosure is to provide an approach for measuring an absolute steering angle using first and second rotatable bodies, wherein one of the first and second rotatable bodies is coupled to the steering shaft.

Figure 2:
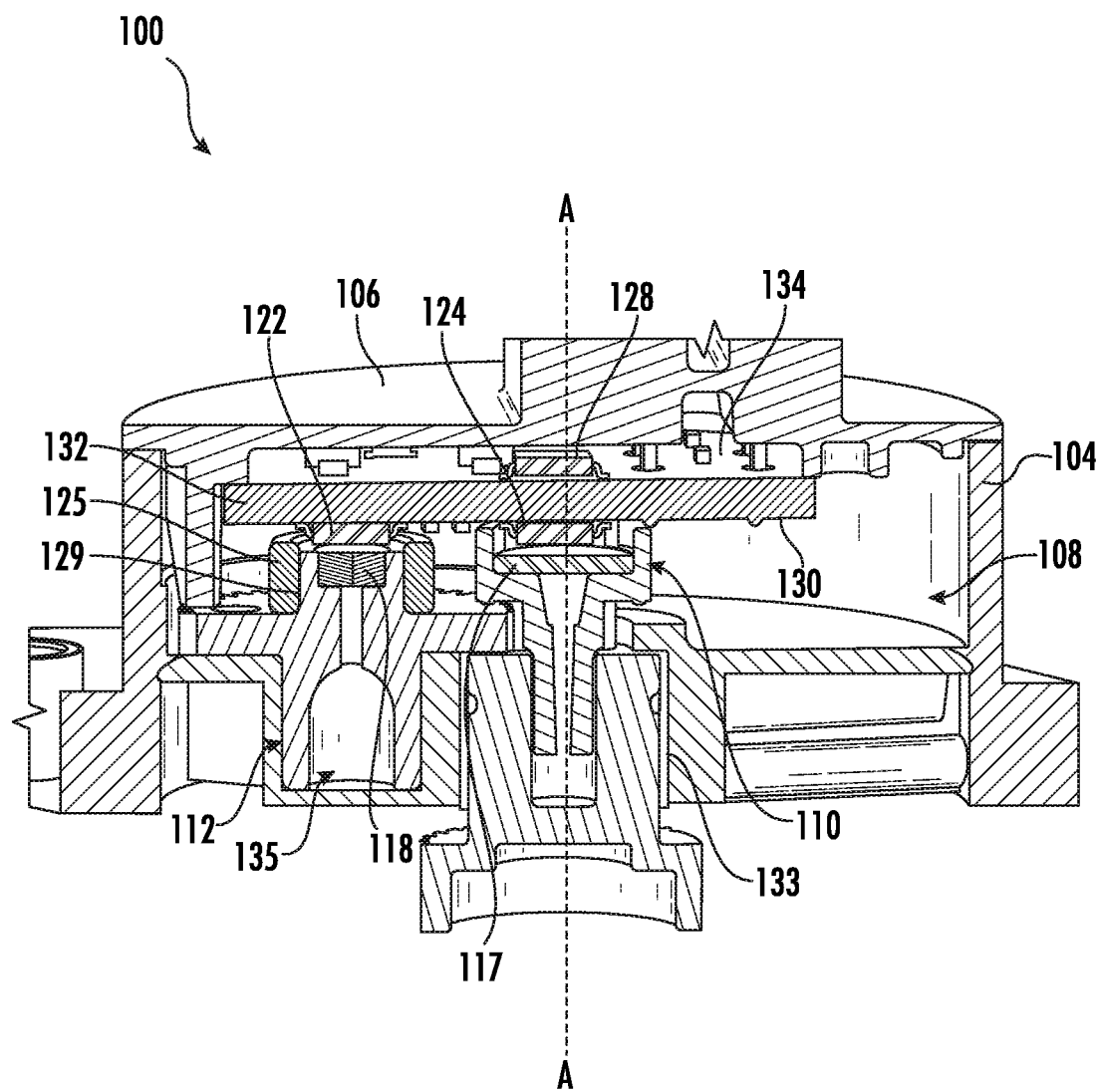
FIG. 2 is a side cross-sectional view of the steering position rotary sensor of FIG. 1 according to exemplary embodiments of the disclosure.

Referring now to FIGS. 1-2, an output steering position rotary sensor (hereinafter "sensor assembly") 100 according to embodiments of the disclosure will be described. The sensor assembly 100 may include a plurality of Hall effect sensors, which are disposed within a housing 102. In some embodiments, the housing 102 may include a base 104 and a cover 106 enclosing a central cavity 108. Within the central cavity 108 is a center shaft 110 extending through the housing 102, and a gear 112, or multiple gear sets, coupled to the center shaft 110. As shown, the gear 112 may be positioned off-center relative to a central rotational axis A-A extending through the center shaft 110. The gear 112 and the center shaft 110 are matingly engaged so as to rotate together.

The sensor assembly 100 may provide gear reduction for multi-turn position applications. Many rotary position applications require both the absolute position of the position in the direct use application as well as knowing how many turns the system has done. Possible implications can include applications where they may be physical limitations of the rotation due to wiring or hydraulic lines that can only accommodate 720 or 1440 total rotation. In the present embodiments, the center shaft 110 may be coupled to a rotatable steering column (not shown). As the steering column rotates, so does the center shaft 110 and thus the gear 112. The center shaft 110 rotates at a period proportional to the gear ratio between the center shaft 110 and the gear 112. For example, a ratio of 4:1 means that for each rotation of the gear 112, the center shaft 110 rotates two rotations. Other gear ratios can be provided.

The gear 112 may include a magnet 118 affixed thereto. As shown, the magnet 118 may be inserted into an end of the gear 112, beneath (in the orientation shown) a first Hall effect chip or sensor 122. The magnet 118 may rotate with the gear 112, and is concentrically aligned with the first Hall effect sensor 122. The magnet 118 is fixed to the gear 112 such that the magnetic field rotates with the gear 112, and is magnetized such that the N-S magnetic polarity is aligned perpendicular to the rotation axis of the gear 112 and the magnet 118. The first Hall effect sensor 122 is located within the housing 102, in close proximity to the magnet 118 such that rotation of the magnet 118 produces a signal from the first Hall effect sensor 122 that is proportional to the angle of rotation of the gear 112.

A second Hall effect chip or sensor 124 may be positioned adjacent the center shaft 110, concentric with the central rotational axis A-A. In some embodiments, the center shaft 110 includes a second magnet 117 coupled thereto. The first Hall effect sensor 122 may be separated from the second Hall effect sensor 124 by one or more magnetic shields 125. In the embodiment shown, the magnetic shield 125 extends concentrically around the magnet 118, for example, along an exterior surface 129 of the gear 112. In other embodiments, additional magnetic shields may be positioned at different places of the sensor assembly 100, for example about the center shaft 110. The magnetic shield 125 may be any material or shape operable to influence magnetic fields from overlapping. For example, by surrounding the first and/or second Hall effect sensors 122, 124 with a material which can conduct magnetic flux better than the materials around it, the magnetic field will tend to flow along the material of the magnetic shield and avoid the objects inside.

A third Hall effect chip or sensor 128 may also be positioned adjacent the center shaft 110, concentric with the central rotational axis A-A. As best shown in FIG. 2, the first Hall effect sensor 122 and the second hall effect sensor 124 may be directly coupled to an internal side 130 of a printed circuit board (PCB) 132 positioned within the central cavity 108 of the housing 102. The third Hall effect sensor 128 may be directly coupled to an external side 134 of the PCB 132. As shown, the second and third Hall effect sensors 124, 128 may be coupled on opposite sides of the PCB 132. One will appreciate that the positions of the first, second, and third Hall effect sensors 122, 124, and 128 is non-limiting and may vary in other embodiments.

In some embodiments, the first, second, and third Hall effect sensors 122, 124, and 128 may be physically and electrically coupled to the PCB 132, for example, by set of wire lines, or PCB traces, which may provide input/output therebetween. The PCB 132 may also include pads for pasting the components and the hall chip thereto. The PCB 132 may be a rigid or flexible PCB. Although not shown, the PCB 132 may further include coupled there to an output signal wire, a power line, and a ground line. In some embodiments, the PCB 132 may include a series of small rigid printed circuit boards, which may be interconnected using the PCB 132 and/or wiring.

As indicated above, in some embodiments, the gear 112 and the center shaft 110 are operated in such a manner as to develop a non-uniform magnetic field (e.g., the magnetic field varies in a periodic manner), wherein magnetic field variation will produce a corresponding variation in the potential difference that is induced in the conductors according to the Hall-effect. The first, second, and third Hall effect sensors 122, 124, and 128 can detect variations in the magnetic field experienced by the individual sensing elements of the hall chips (e.g., current-carrying conductor) and can be constructed based upon this Hall-effect phenomenon. In one embodiment, using the Hall-effect, the first, second, and third Hall effect sensors 122, 124, and 128 assist to detect a steering column and to generate an electric digital signal proportional to the rotary steering position. It will be appreciated that greater or fewer than three Hall effect sensors may be used in other implementations.

In non-limiting embodiments, the sensor assembly 100 may be assembled as follows. First, the 2-stage over molded housing 102 may be provided. Second, the molded center shaft 110 and gear 112 may be coupled to the housing 102. For example, the center shaft 110 may be inserted through a center slot 133 of the housing, the center slot 133 extending along the central rotational axis A-A. In some embodiments, the center shaft 110 may include one or more O-rings along an exterior surface thereof to provide a seal between the center shaft 110 and the wall(s) defining the center slot 133. The gear 112 may be inserted into an off-center slot 135. Both the center slot 133 and the off-center slot 135 permit rotation therein of the center shaft 110 and the gear 112, respectively. Corresponding teeth or splines of the center shaft 110 and the gear 112 may be brought into engagement with one another.

Third, the magnets may be added to one or more of the center shaft 110 and the gear 112. In some embodiments, the magnets are discs configured to rotate along the center shaft 110 and the gear 112. In some embodiments, the magnets may be diametrically polarized. Fourth, the first, second, and third Hall effect sensors 122, 124, and 128 may be secured to the PCB 132. Fifth, the PCB may be secured to the housing 102, over the center shaft 110 and the gear 112. One will appreciate that although this assembly approach is described above as a series of acts or events, the present disclosure is not limited by the recited ordering of such acts or events unless specifically stated. For example, some acts may occur in different orders and/or concurrently with other acts or events apart from those illustrated and/or described herein, in accordance with the disclosure. In addition, not all illustrated acts or events may be required to implement a methodology in accordance with the present disclosure.

Figure 3:
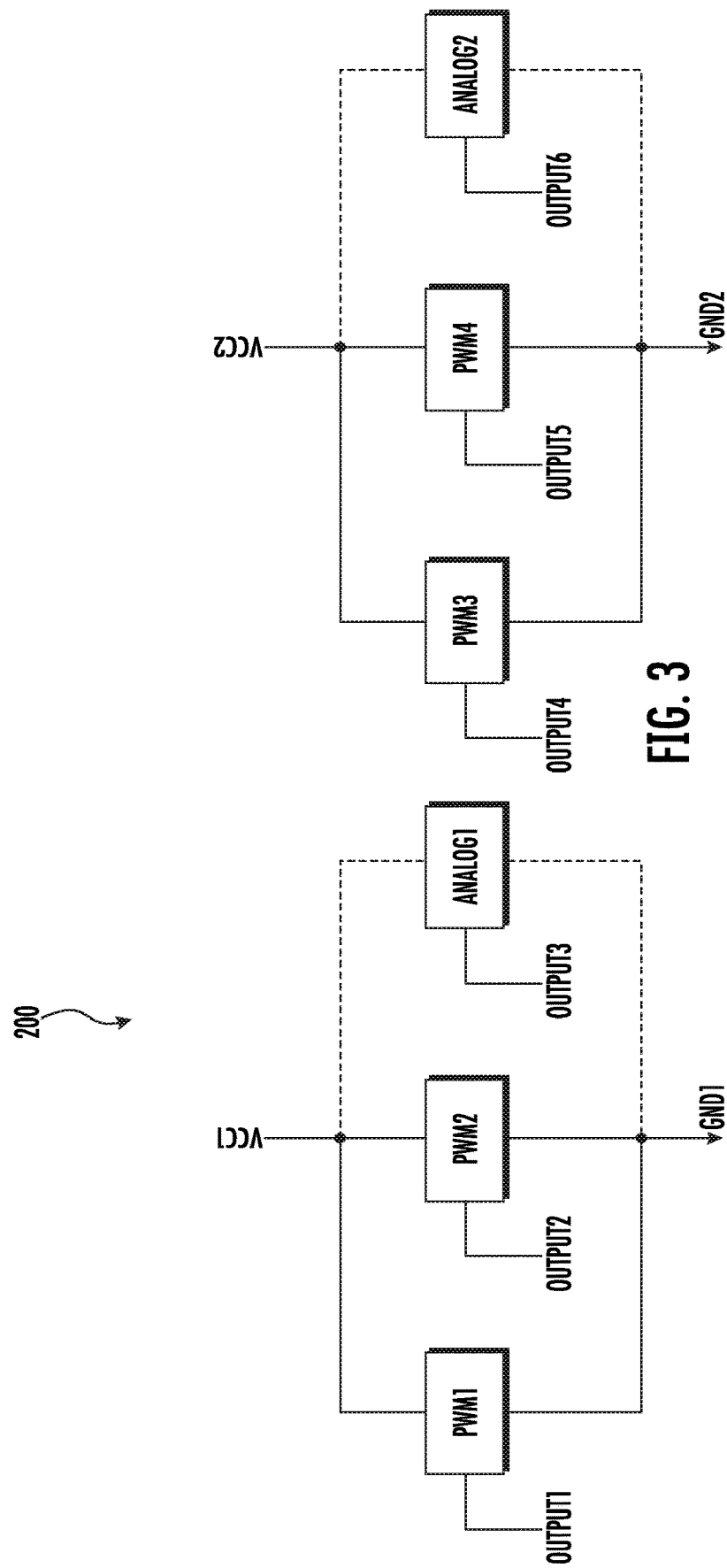
FIG. 3 is a circuit diagram illustrating an electrical interface of a magnet of the steering position rotary sensor of FIG. 1 according to exemplary embodiments of the disclosure.

In some embodiments, the sensor assembly 100 is capable of generating 4 pulse width modulation (PWM)/Analog output signals from the second and third Hall effect sensors 124, 128 related to the position of the center shaft 110. The sensor assembly 100 is further capable of generating 2 PWM/Analog signals from the first Hall effect sensor 122 for turn count of the gear 112. This is demonstrated in the circuit diagram 200 of FIG. 3. In the non-limiting example shown, the sensor assembly 100 may include a redundant electrical interface, wherein the output signal (e.g., OUTPUT1-4) can be PWM (e.g., PWM1-4) or Analog (e.g., ANALOG1-2) in each case. The turn count may be provided by the signal by comparing the output to what the zero position would be. In the case of an analog signal, the zero voltage point may be 2.5 v, and then as the sensor is actuating up to the end of travel in the clockwise direction, it would move up to 4.5 v. While rotating in the counter clockwise direction, it would fall to 0.5 v. The indication of the signal can then determine the counts from this reading. Furthermore, the PWM corresponds to the duty cycle.

Figure 4:
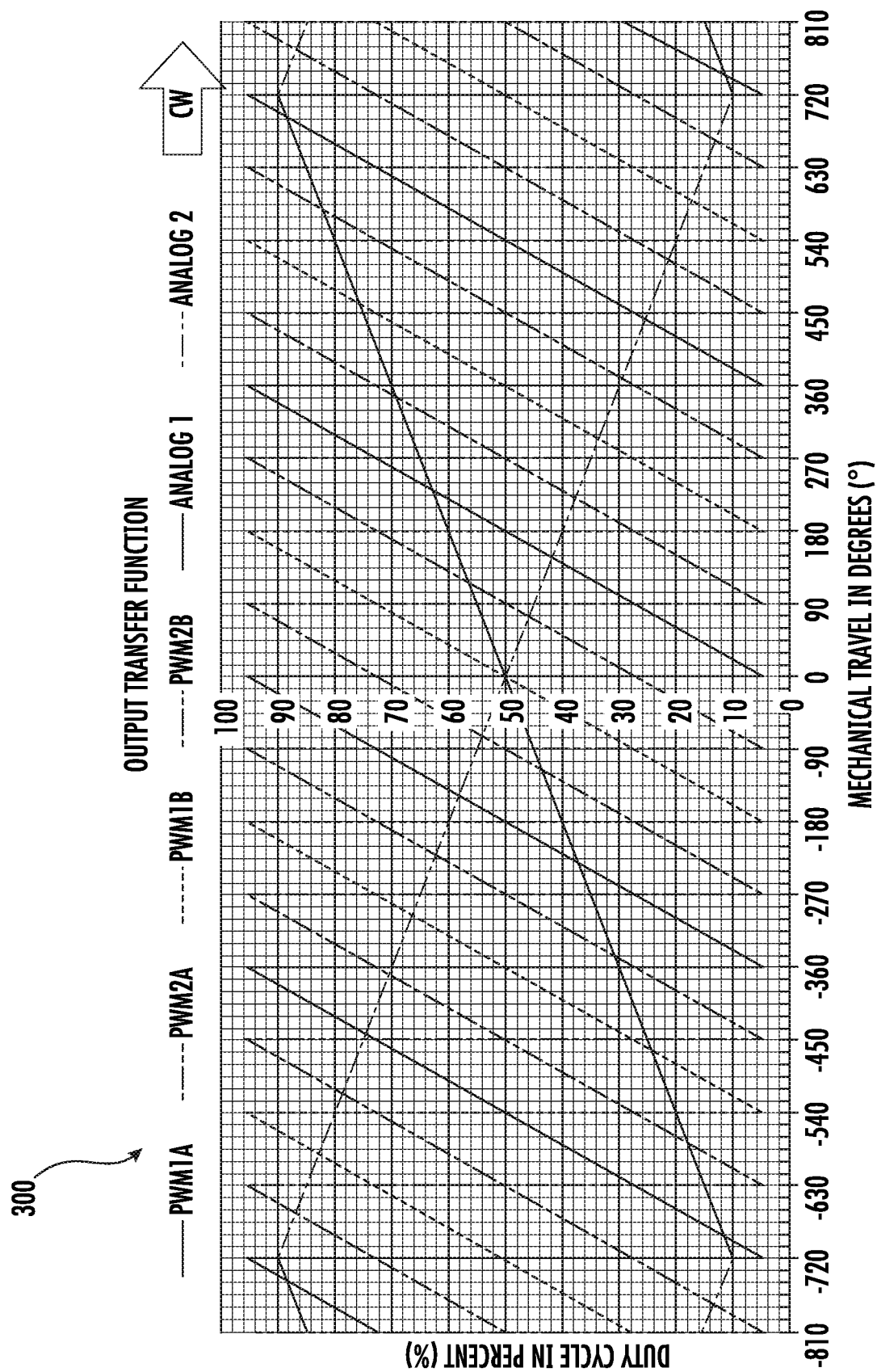
FIG. 4 is a graph illustrating an output function of the steering position rotary sensor of FIG. 1 according to exemplary embodiments of the disclosure.

FIG. 4 is a graph 300 illustrating an example output function generated by the sensor assembly 100. As shown, the repeating PWM of the absolute position is overlaid on top of the full scale voltage range.

In sum, at least the following technical benefits/advantages are provided by the embodiments herein. Firstly, of the sensor assembly provides a low-cost solution. By utilizing a plastic gear set and housing build, the sensor can be cheaper to make in mass production over a machined part. Additionally, the electronics system can be cheaper and more simple and robust than a microprocessor would require due to fewer components being required. Secondly, the EMC/EMI protections are more robust. Thirdly, safety is increased due to the redundancy of the system. Specifically, the pair of redundant circuits ensures that the system/vehicle will be able to be brought to rest if a major error occurs. Because the signals can be a mirror of one another, diagnosing which signal has the error is also simpler. Fourthly, by utilizing a shielded magnetic system, the overall size of the sensor can be reduced as the possibility for cross talk between the magnetic signal systems is eliminated or significantly reduced. Fifthly, the sensor system provides a good amount of flexibility, i.e., virtually any number of signal combinations can be generated to support the end user needs. As such, the gear ratio can be changed to add or reduce the number of turns before the signal rollover.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. An assembly comprising:
   a housing;
   a center shaft extending through the housing a gear coupled to the center shaft, the gear positioned off-center relative to a central rotational axis extending through the center shaft;
   a magnet coupled to the gear;

a first Hall effect sensor positioned adjacent the gear and concentric with the magnet;

a second Hall effect sensor positioned adjacent the center shaft and concentric with the central rotational axis, wherein the first Hall effect sensor and the second Hall effect sensor are separated by a magnetic shield in direct contact with an exterior surface of the gear, and wherein the magnetic shield extends concentrically about the magnet along the exterior surface of the gear; and a printed circuit board (PCB) within the housing, wherein the first Hall effect sensor and the second Hall effect sensor are directly coupled to an internal side of the PCB.

2. The assembly of claim 1, further comprising a third Hall effect sensor.

3. The assembly of claim 2, wherein the third Hall effect sensor is directly coupled to an external side of the PCB, and wherein the third Hall effect sensor is concentric with the central rotational axis.

4. The assembly of claim 1, wherein the center shaft includes a second magnet.

5. The assembly of claim 1, wherein the gear and the center shaft interact to provide a gear reduction of approximately 4:1.

6. A steering position rotary sensor assembly comprising:
a housing defining an internal cavity;
a center shaft extending through the housing;
a gear coupled to the center shaft, the gear positioned off-center relative to a central rotational axis extending through the center shaft;
a magnet coupled to the gear;
a first Hall effect sensor positioned adjacent the gear and concentric with the magnet;
a second Hall effect sensor positioned adjacent the center shaft and concentric with the central rotational axis, wherein the first Hall effect sensor and the second Hall effect sensor are separated by a magnetic shield in direct contact with an exterior surface of the gear, and wherein the magnetic shield extend concentrically about the magnet along the exterior surface of the gear; and
a printed circuit board (PCB) within the internal cavity of the housing, wherein the PCB includes an internal side and an external side, and wherein the first Hall effect sensor and the second Hall effect sensor are directly coupled to the internal side.

7. The steering position rotary sensor assembly of claim 6, further comprising a third Hall effect sensor, wherein the third Hall effect sensor is directly coupled to the external side of the PCB, and wherein the third Hall effect sensor is concentric with the central rotational axis.

8. The steering position rotary sensor assembly of claim 6, wherein the center shaft includes a second magnet.

9. The steering position rotary sensor assembly of claim 6, wherein the gear and the center shaft interact to provide a gear reduction of approximately 4:1.

10. A steering position rotary sensor assembly comprising:
a housing defining an internal cavity;
a center shaft extending through the housing;
a gear coupled to the center shaft, the gear positioned off-center relative to a central rotational axis extending through the center shaft;
a magnet affixed to the gear, the magnet positioned within the internal cavity of the housing;
a first Hall effect sensor positioned adjacent the gear and concentric with the magnet;
a second Hall effect sensor positioned adjacent the center shaft and concentric with the central rotational axis, wherein the first Hall effect sensor and the second Hall effect sensor are separated by a magnetic shield in direct contact with an exterior surface of the gear, and wherein the magnetic shield extends concentrically about the magnet along the exterior surface of the gear; and
a printed circuit board (PCB) within the internal cavity of the housing, wherein the PCB includes an internal side and an external side, and wherein the first Hall effect sensor and the second Hall effect sensor are directly coupled to the internal side.

11. The steering position rotary sensor assembly of claim 10, further comprising a third Hall effect sensor, wherein the third Hall effect sensor is directly coupled to the external side of the PCB, and wherein the third Hall effect sensor is concentric with the central rotational axis.

12. The steering position rotary sensor assembly of claim 11, wherein the center shaft includes a second magnet.

* * * * *